(12) United States Patent
Kobs

(10) Patent No.: US 11,623,170 B2
(45) Date of Patent: Apr. 11, 2023

(54) HIGH CAPACITY LOW RESTRICTION DIESEL GENERATOR AIR FILTRATION SYSTEM

(71) Applicant: Stewart & Stevenson Manufacturing Technologies, LLC, Houston, TX (US)

(72) Inventor: Donald Kobs, Denver, CO (US)

(73) Assignee: STEWART & STEVENSON LLC, Houston, TX (US)

(*) Notice: Subject to any disclaimer, the term of this patent is extended or adjusted under 35 U.S.C. 154(b) by 275 days.

(21) Appl. No.: 17/101,721

(22) Filed: Nov. 23, 2020

(65) Prior Publication Data
US 2022/0161174 A1  May 26, 2022

(51) Int. Cl.
*B01D 46/00* (2022.01)
*F02B 63/04* (2006.01)

(52) U.S. Cl.
CPC ....... *B01D 46/0005* (2013.01); *B01D 46/001* (2013.01); *F02B 63/047* (2013.01); *B01D 2265/024* (2013.01); *B01D 2265/029* (2013.01); *B01D 2279/60* (2013.01); *F02B 2063/045* (2013.01)

(58) Field of Classification Search
CPC .............. B01D 46/0005; B01D 46/001; B01D 2265/024; B01D 2265/029; B01D 2279/60; F02B 63/047; F02B 2063/045
USPC ........................................................... 55/497
See application file for complete search history.

(56) References Cited

U.S. PATENT DOCUMENTS

| 10,603,616 | B1* | 3/2020 | Nance | B01D 46/0002 |
| 2005/0138905 | A1* | 6/2005 | Kubokawa | B01D 46/521 |
| | | | | 55/497 |
| 2016/0378057 | A1* | 12/2016 | Yamaguchi | G03G 21/206 |
| | | | | 55/492 |
| 2019/0063341 | A1* | 2/2019 | Davis | F02D 29/06 |
| 2019/0277517 | A1* | 9/2019 | Nanjappa | B01D 46/02 |
| 2021/0025324 | A1* | 1/2021 | Morris | F02M 35/02416 |

* cited by examiner

*Primary Examiner* — Robert A Hopkins
*Assistant Examiner* — Qianping He
(74) *Attorney, Agent, or Firm* — Ewing & Jones, PLLC

(57) ABSTRACT

An air filtration system is coupled to an inlet of an enclosure of or to a piece of equipment. The air filtration system is coupled to the enclosure at the air inlet such that air entering the enclosure through the air inlet passes through the air filtration system. The air filtration system includes a frame assembly. The frame assembly includes an outer frame and a support mesh. The outer frame is coupled to the enclosure. The air filtration system includes a door assembly. The door assembly includes a door frame and a door support mesh. The door assembly is received by and mechanically coupled to the frame assembly. The air filtration system includes filter media positioned in an interior of the air filtration system defined by the frame assembly and the door assembly.

12 Claims, 6 Drawing Sheets

HIGH CAPACITY LOW RESTRICTION DIESEL GENERATOR AIR FILTRATION SYSTEM

TECHNICAL FIELD/FIELD OF THE DISCLOSURE

The present disclosure relates generally to oilfield equipment, and specifically to air handling for engine-powered equipment.

BACKGROUND OF THE DISCLOSURE

Wellsite equipment, including power generators, pumps, blenders, and other engine-driven equipment, is often operated in unimproved, dusty environments. Accordingly, air supplied to the power units of such equipment, often diesel engines, requires filtration before being used thereby. Existing air filters intended for use by such equipment are supplied as pre-manufactured assemblies without allowing for variation in size or configuration of the filters. Additionally, the constraints upon the equipment caused by the obligatory use of pre-manufactured air filter assemblies may restrict the available configurations of the equipment itself, restrict the number of options for filter media, and may result in increased costs due to the need to purchase each filter assembly separately and potential mismatches between available filter media and application.

Other equipment subject to high-dust environments may be subject to the same disadvantages of using pre-manufactured air filter assemblies including, for example, other oil field equipment, rail grinding equipment, sandblasting machinery, fans and other forced-air ventilation systems, mining equipment, logging equipment, and food service equipment.

SUMMARY

The present disclosure provides for a power generator trailer. The power generator trailer may include an enclosure, the enclosure including at least one air inlet. The power generator trailer may include a diesel engine positioned within the enclosure. The power generator trailer may include an air filtration system. The air filtration system may be coupled to the enclosure at the air inlet such that air entering the enclosure through the air inlet passes through the air filtration system. The air filtration system may include a frame assembly. The frame assembly may include an outer frame and a support mesh. The outer frame may be coupled to the enclosure. The air filtration system may include a door assembly. The door assembly may include a door frame and a door support mesh. The door assembly may be received by and mechanically coupled to the frame assembly. The air filtration system may include filter media positioned in an interior of the air filtration system defined by the frame assembly and the door assembly.

The present disclosure also provides for an air filtration system. The air filtration system may include a frame assembly. The frame assembly may include an outer frame and a support mesh. The outer frame may be coupled to the enclosure. The air filtration system may include a door assembly. The door assembly may include a door frame and a door support mesh. The door assembly may be received by and mechanically coupled to the frame assembly. The air filtration system may include filter media positioned in an interior of the air filtration system defined by the frame assembly and the door assembly.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
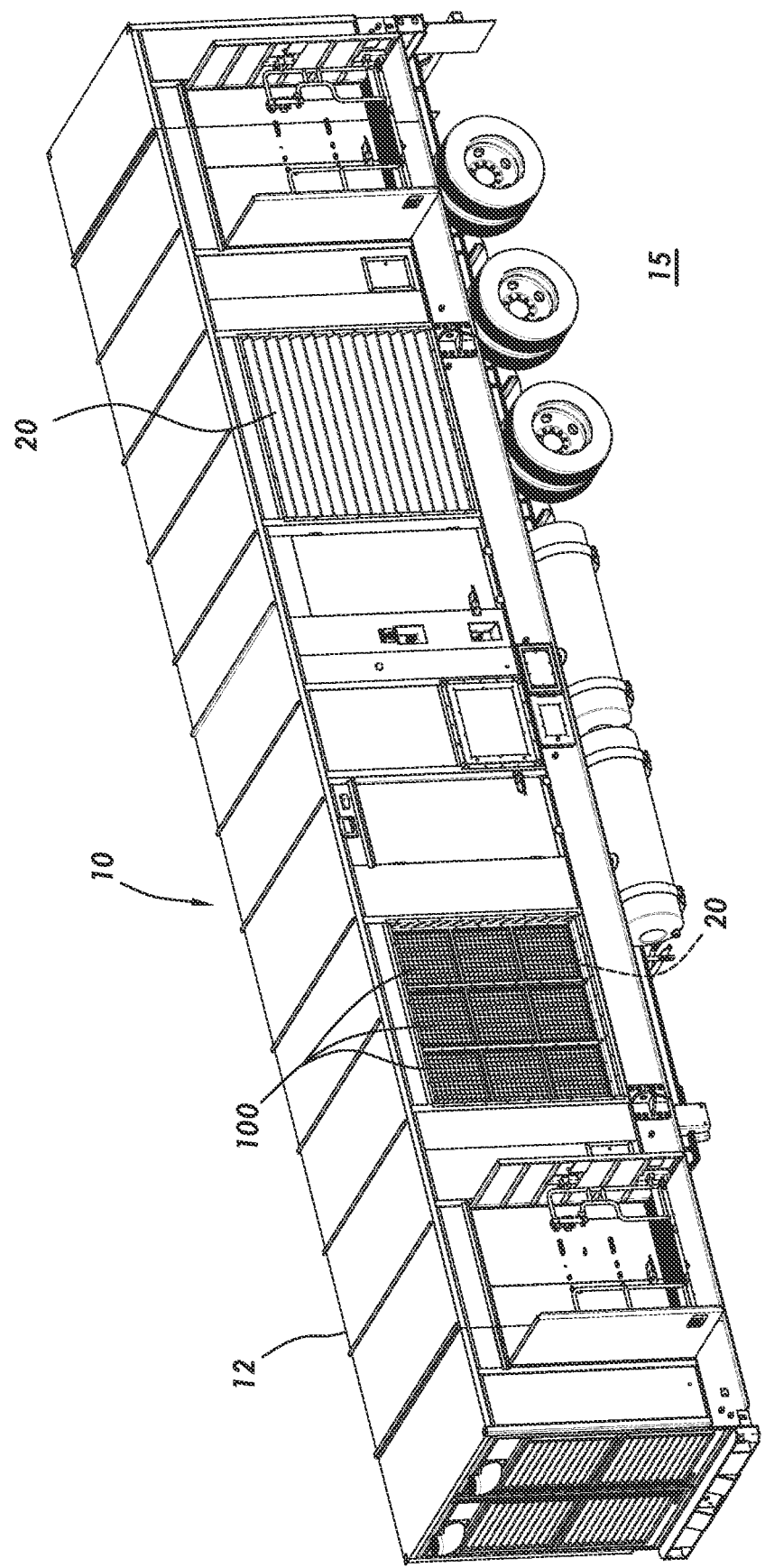
FIG. 1 depicts a power generator trailer including air filtration systems consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 depicts a perspective view of power generator trailer 10. Power generator trailer 10 may be positioned in wellsite 15 and may be used to provide electric power for other equipment located in wellsite 15. Power generator trailer 10 may include enclosure 12 positioned to house equipment used for the generation of such electric power including, for example and without limitation, one or more diesel engines and one or more generators. As wellsite 15 may be an unimproved location and may be a high-dust environment inherently and/or as a result of activities on wellsite 15, power generator trailer 10 may enclose the equipment therein to provide dust and weather protection. However, because certain components of power generator trailer 10, including diesel engines, require a continuous supply of air to operate, power generator trailer 10 may include air inlets 20 formed in enclosure 12. In some embodiments, each air inlet 20 may be configured to pass air into power generator trailer 10 through one or more air filtration systems 100.

Figure 2:
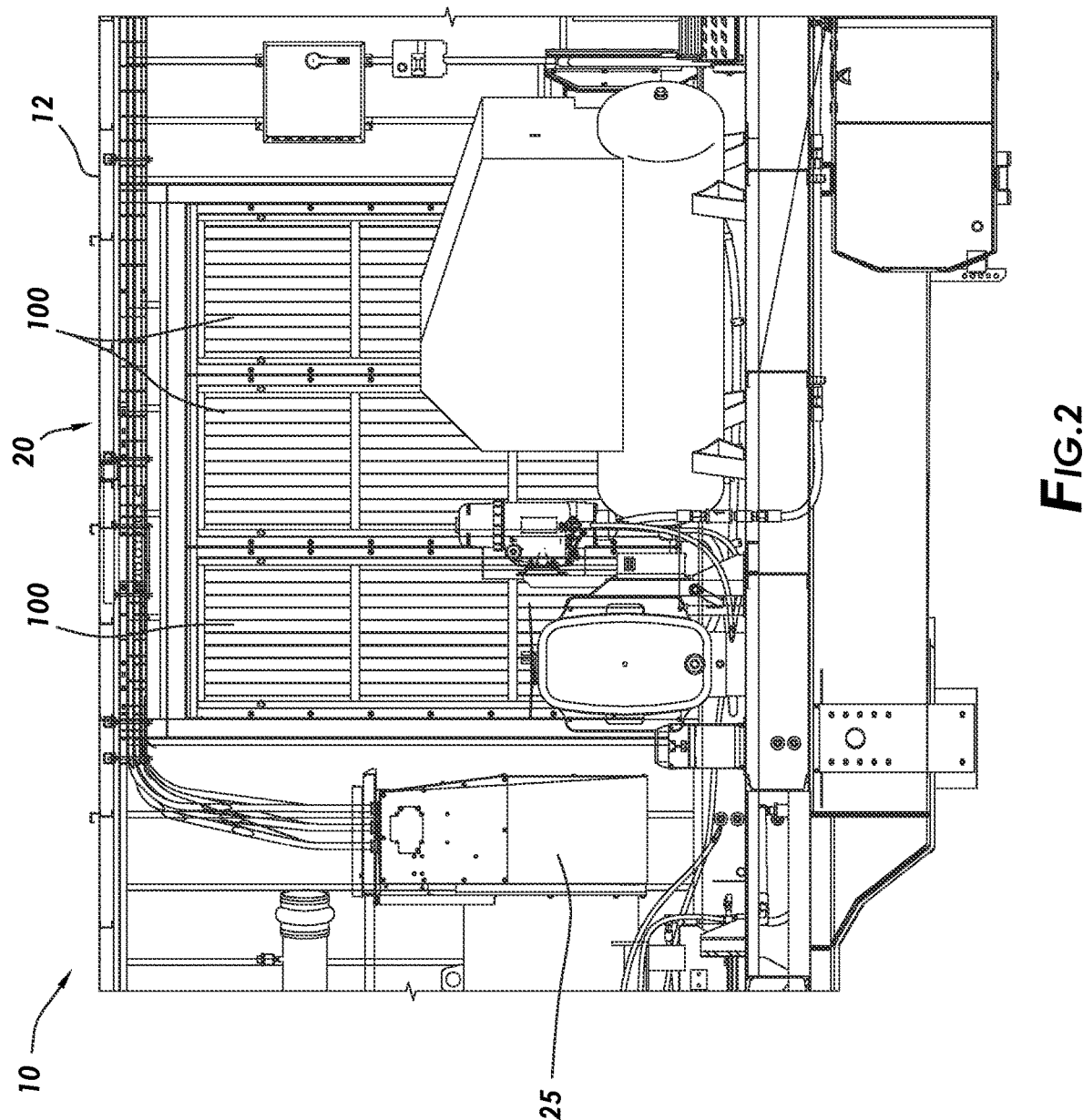
FIG. 2 depicts a view of the inside of the power generator trailer of FIG. 1 showing air filtration systems.

FIG. 2 depicts a view of power generator trailer 10 from the inside thereof showing the interior of air inlet 20. As shown, three air filtration systems 100 are positioned within air inlet 20 such that air passing through air inlet 20 pass through air filtration systems 100. Although air inlet 20 is depicted as including three air filtration systems 100, air inlet 20 may be formed in any desired configuration and may include any number of air filtration systems 100. Additionally, although depicted as being formed vertically, air inlet 20 and air filtration systems 100 may be positioned horizontally. As discussed further below, air passing into power generator trailer 10 may pass through air filtration systems 100 such that dust is removed from said air before reaching equipment within power generator trailer 10 such as, for example and without limitation, diesel engines 25.

Figure 3:
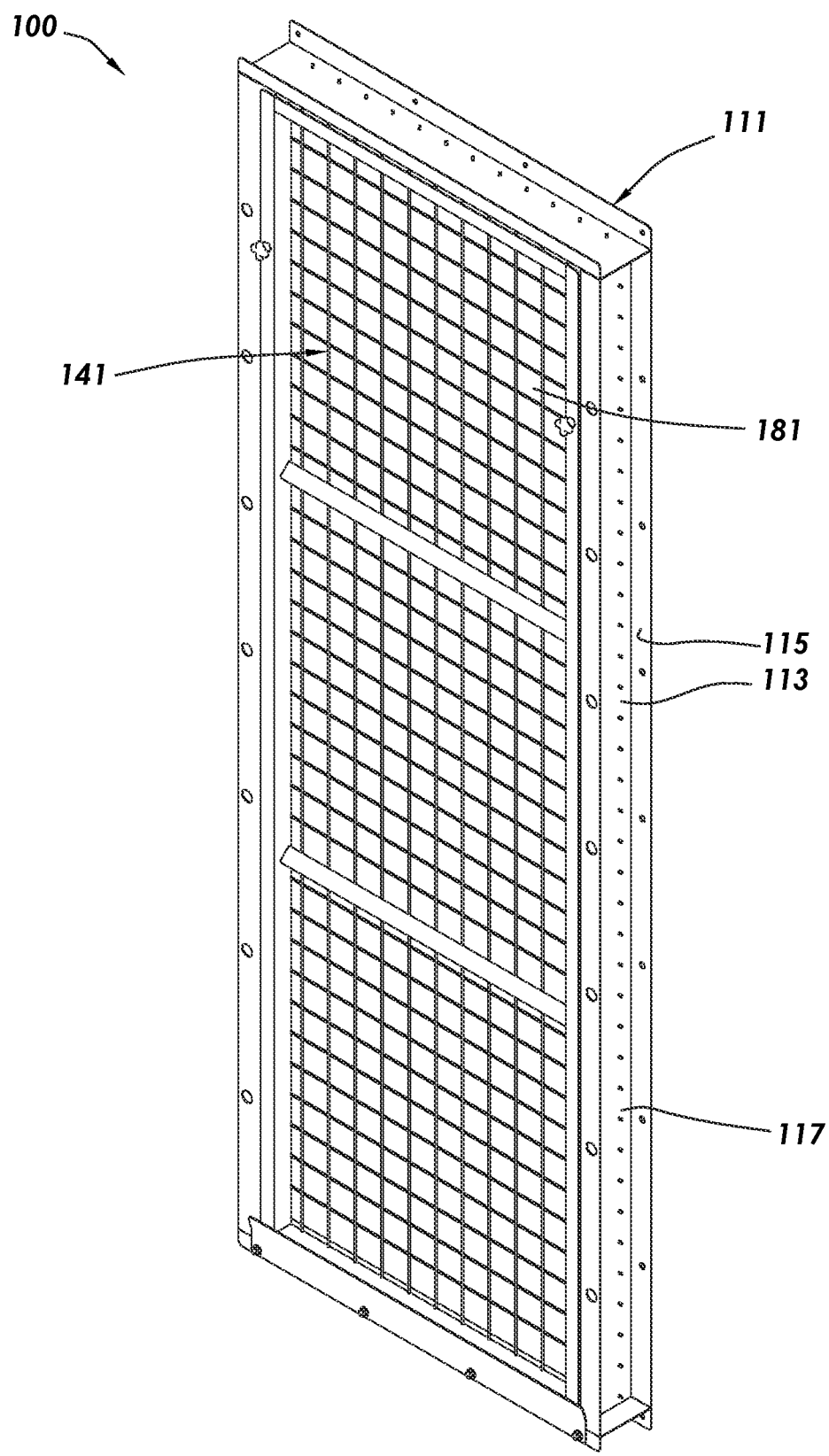
FIG. 3 depicts a perspective view of an air filtration system consistent with at least one embodiment of the present disclosure.
Figure 4:
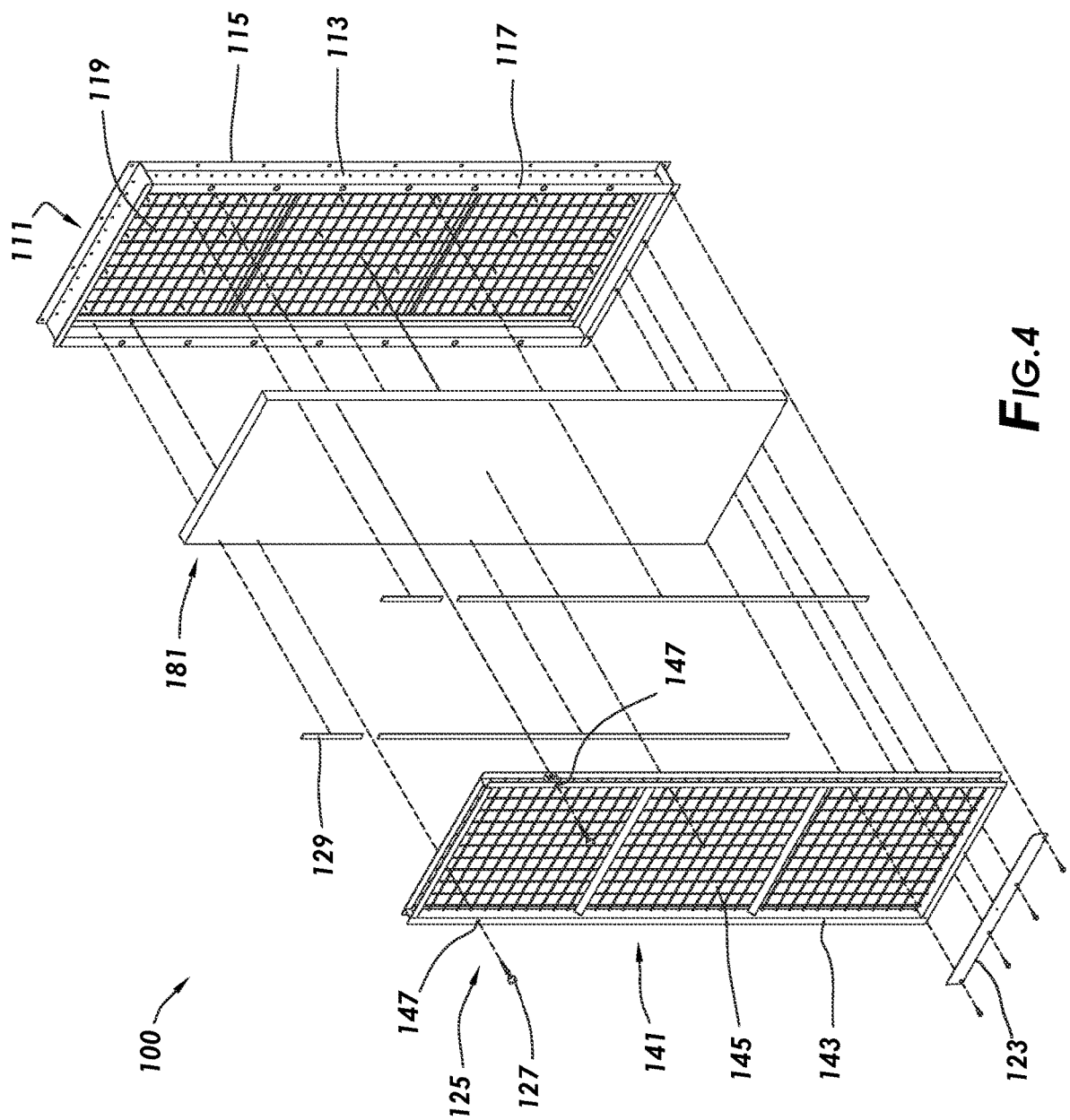
FIG. 4 depicts an exploded view of the air filtration system of FIG. 3.

FIGS. 3 and 4 depict air filtration system 100 consistent with at least one embodiment of the present disclosure. In some embodiments, air filtration system 100 may include frame assembly 111 and door assembly 141. Frame assembly 111 and door assembly 141 may define an interior of air filtration system 100 that may be used to hold filter media 181 in position to filter air used by the equipment to which air filtration system 100 is coupled.

Frame assembly 111 may be adapted to be mounted to a piece of equipment for which air filtration system 100 will be used. For example, in the embodiment depicted in FIG. 2, each air filtration system 100 includes frame assembly 111 coupled directly to power generator trailer 10.

In some embodiments, with reference to FIG. 4, frame assembly 111 may include outer frame 113. Outer frame 113 may include mounting flange 115, which may be used to couple frame assembly 111 to a piece of equipment for which air filtration system 100 will be used. Outer frame 113 may include sidewalls 117 positioned to enclose filter media 181 as further described below.

Figure 5:
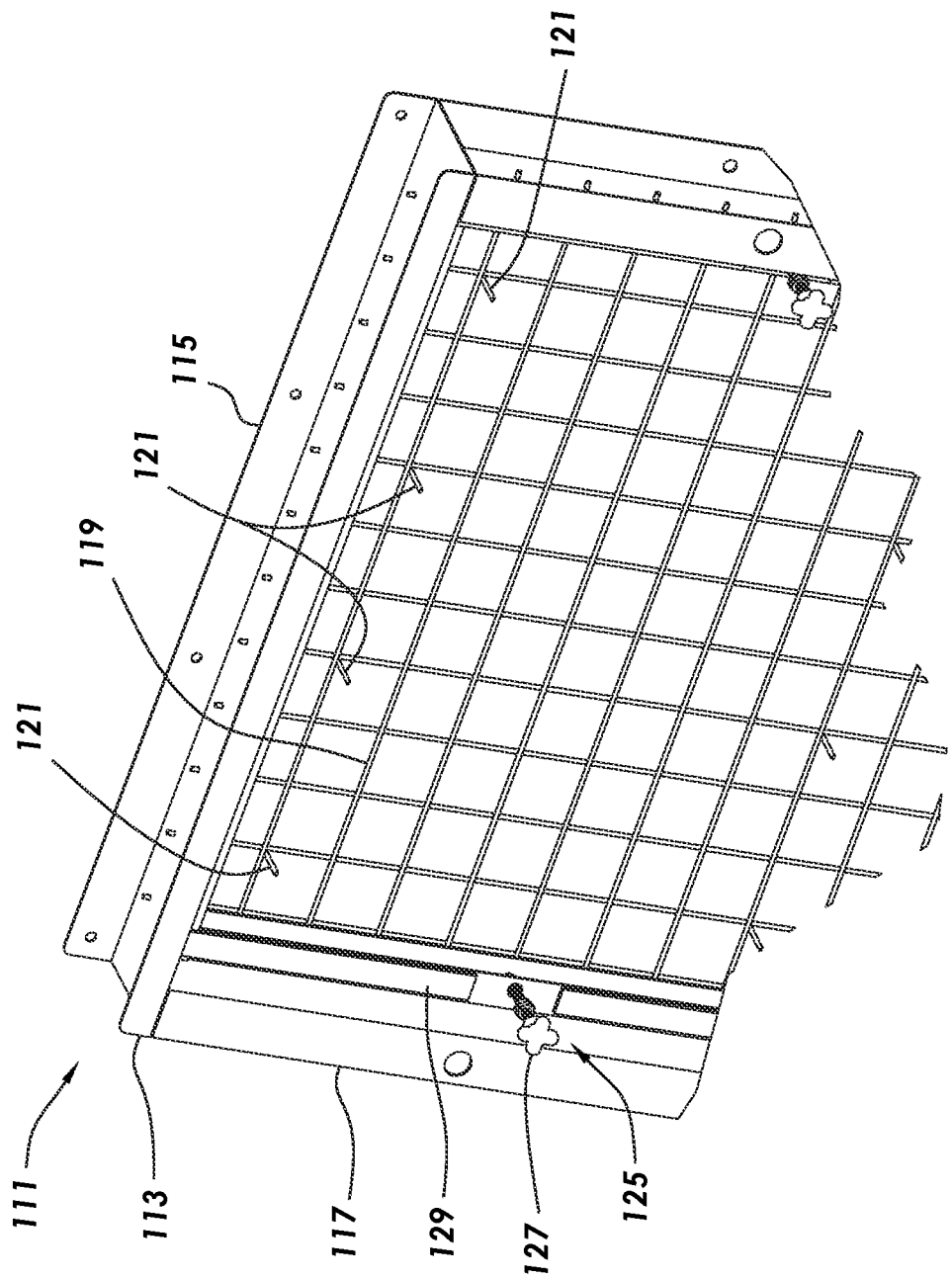
FIG. 5 depicts a detail view of a frame of an air filtration system consistent with at least one embodiment of the present disclosure.

In some embodiments, frame assembly 111 may include support mesh 119. Support mesh 119 may be adapted to allow airflow therethrough while retaining filter media 181 within air filtration system 100. In some embodiments, shown in detail in FIG. 5, support mesh 119 may include one or more support pins 121 that may extend into the interior of frame assembly 111 to, for example and without limitation, engage filter media 181 to assist with the installation of filter media 181 to frame assembly 111 and prevent or reduce sagging of filter media 181 over time during operation of air filtration system 100.

In some embodiments, frame assembly 111 may include lower retaining bracket 123. Lower retaining bracket 123 may be used to retain door assembly 141 to frame assembly 111 when air filtration system 100 is assembled. In some embodiments, frame assembly 111 may further include one or more door retention assemblies 125. In some embodiments, as shown in in FIG. 5, door retention assemblies 125 may include retention screw 127 threadedly coupled to outer frame 113 of frame assembly 111 positioned to selectively couple door assembly 141 to frame assembly 111 while allowing door assembly 141 to be removed therefrom.

In some embodiments, door assembly 141, as shown in FIG. 4, may include door frame 143. Door frame 143 may be configured to engage outer frame 113 of frame assembly 111 such that door assembly 141 may be received by frame assembly 111 to retain filter media 181 as further discussed below. In some embodiments, frame assembly 111 may include one or more seal elements 129 positioned to engage against door frame 143 of door assembly 141, thereby reducing or preventing unfiltered air from passing between frame assembly 111 and door assembly 141, thereby bypassing filter media 181.

In some embodiments, door assembly 141 may include door support mesh 145. Door support mesh 145 may be adapted to allow airflow therethrough while retaining filter media 181 within air filtration system 100.

In some embodiments, door frame 143 may be adapted to fit into lower retaining bracket 123. In some embodiments, door frame 143 may include retention slots 147 positioned to receive retention screws 127 of door retention assemblies 125.

Figure 6:
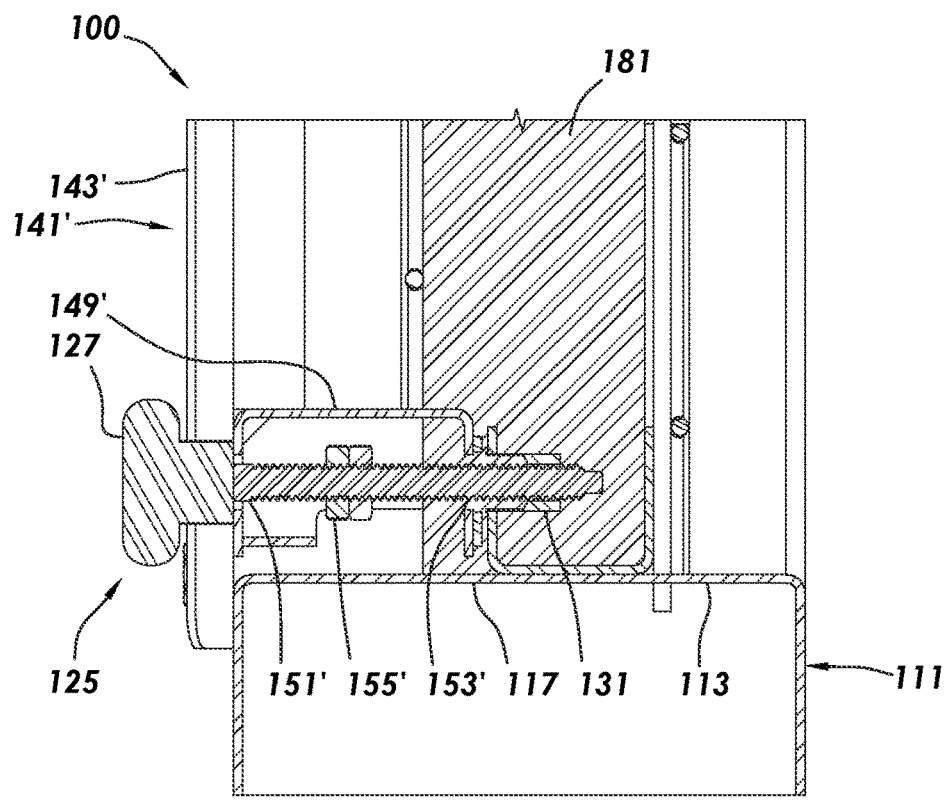
FIG. 6 depicts a detail cross section view of the air filtration system of FIG. 3.
Figure 7:
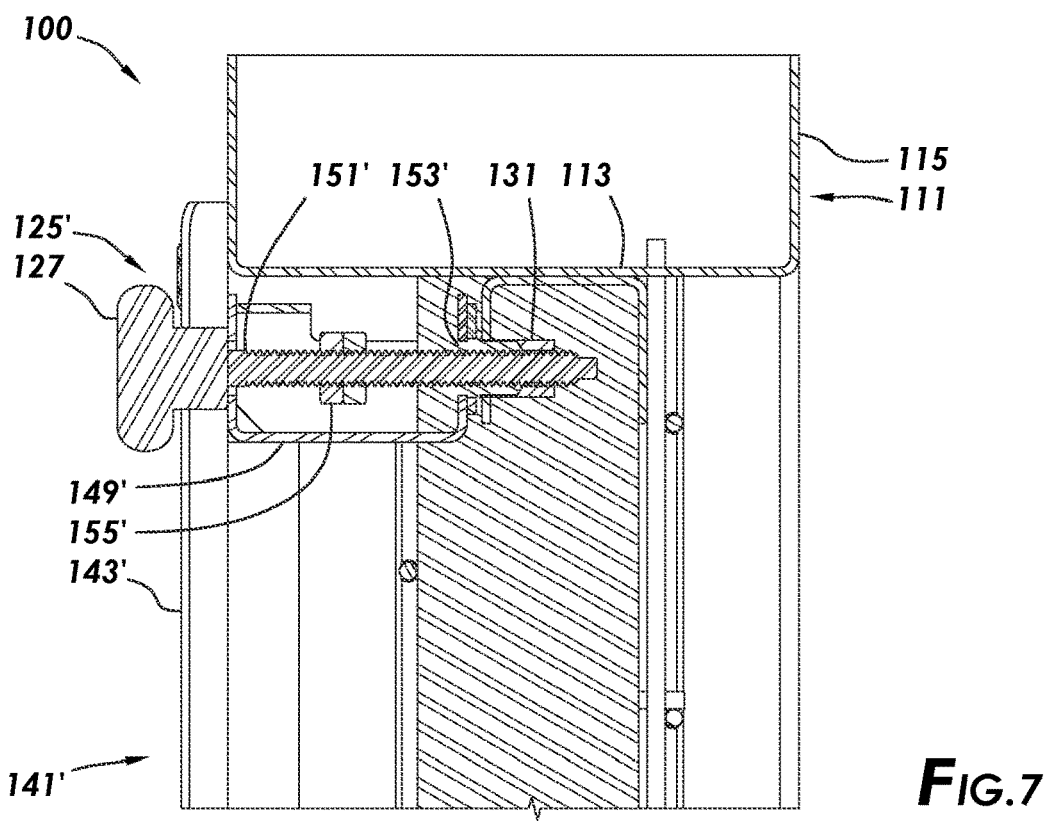
FIG. 7 depicts a detail cross section view of the air filtration system of FIG. 3 with filter media removed.

In other embodiments, such as shown in detail in FIGS. 6 and 7, door retention assemblies 125' may be captive to door frame 143'. In such an embodiment, door frame 143' may include retention bracket 149'. Retention bracket 149' may be generally U-shaped and may include outer retention holes 151' and inner retention holes 153'. Retention screws 127 may pass through retention bracket 149' through outer retention holes 151' and inner retention holes 153'. In some embodiments, one or more retention features 155' including, for example and without limitation, jam nuts, may be coupled to retention screws 127 such that retention screws 127 are captive to door frame 143' while allowing retention screws 127 to move and turn relative thereto. In such an embodiment, outer frame 113 may include threaded holes 131 positioned to receive retention screws 127, thereby allowing door assembly 141' to be selectively coupled to frame assembly 111.

In some embodiments, filter media 181 may be supplied as bulk material, such as on un-cut rolls of filter material. Filter media 181 may be selected such that the filtering properties of filter media 181 correspond with the desired application and environment of the equipment to which air filtration system 100 is to be used.

In some embodiments, in order to install a new piece of filter media 181 to air filtration system 100, filter media 181 may be cut to match the size of the interior of frame assembly 111. Door assembly 141 may be removed as shown in FIG. 4, by removing or loosening retention screws 127 such that door assembly 141 may be removed from frame assembly 111. Any used filter media 181 within air filtration system 100 may be removed and discarded. The new piece of filter media 181 may be positioned within frame assembly 111 such that filter media 181 is positioned within outer frame 113 and against support mesh 119. In some embodiments, filter media 181 may be engaged by support pins 121 of support mesh 119 such that filter media 181 is retained to frame assembly 111 without sagging. Door assembly 141 may then be reinstalled to frame assembly 111 such that, in some embodiments, door assembly 141 engages lower retaining bracket 123 and/or door retention assemblies 125 are engaged.

Although described herein above with respect to generator equipment, one of ordinary skill in the art with the benefit of this disclosure will understand that air filtration system 100 may be used for any machine or other piece of equipment that requires high airflow in a high-dust environment. For example and without limitation, air filtration system 100 may be used for air filtration for oil field equipment such as pumps and blenders, rail grinding equipment, mining equipment, logging equipment, and food service equipment. Additionally, air filtration system 100 may be used in other equipment requiring air-handling apparatuses such as, for example, sandblasting machinery, fans, or forced-air ventilation systems.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A power generator trailer, the power generator trailer including:
    an enclosure, the enclosure including at least one air inlet;
    a diesel engine positioned within the enclosure; and
    an air filtration system, the air filtration system coupled to the enclosure at the air inlet such that air entering the enclosure through the air inlet passes through the air filtration system, the air filtration system including:
        a frame assembly, the frame assembly including an outer frame and a support mesh, the outer frame coupled to the enclosure;
        a door assembly, the door assembly including a door frame and a door support mesh, the door assembly received by and mechanically coupled to the frame assembly;
        filter media positioned in an interior of the air filtration system defined by the frame assembly and the door assembly, and
        a door retention assembly, the door retention assembly positioned to couple the door assembly to the frame assembly, the door retention assembly comprising a retention screw threadedly coupled to the frame assembly and passing through a slot or hole formed in the door frame, wherein the door frame comprises a retention bracket, the retention bracket being U-shaped, the retention bracket including an outer retention hole and an inner retention hole, the retention screw passing through the outer and inner retention holes.

2. The power generator trailer of claim 1, wherein the support mesh of the frame assembly further comprises one or more support pins, the support pins engaging the filter media.

3. The power generator trailer of claim 1, wherein the outer frame of the frame assembly further comprises a mounting flange, the frame assembly coupled to the enclosure by the mounting flange.

4. The power generator trailer of claim 1, wherein the frame assembly further comprises a lower retaining bracket, the lower retaining bracket positioned to retain the door assembly to the frame assembly.

5. The power generator trailer of claim 1, wherein the door retention assembly further comprises a retention feature adapted to retain the retention screw to the retention bracket.

6. The power generator trailer of claim 5, wherein the retention feature comprises jam nuts.

7. An air filtration system comprising:
    a frame assembly, the frame assembly including an outer frame and a support mesh;
    a door assembly, the door assembly including a door frame and a door support mesh, the door assembly received by and mechanically coupled to the frame assembly;
    filter media positioned in an interior of the air filtration system defined by the frame assembly and the door assembly, and
    a door retention assembly, the door retention assembly positioned to couple the door assembly to the frame assembly, the door retention assembly comprising a retention screw threadedly coupled to the frame assembly and passing through a slot or hole formed in the door frame, wherein the door frame comprises a retention bracket, the retention bracket being U-shaped, the retention bracket including an outer retention hole and an inner retention hole, the retention screw passing through the outer and inner retention holes.

8. The air filtration system of claim 7, wherein the support mesh of the frame assembly further comprises one or more support pins, the support pins engaging the filter media.

9. The air filtration system of claim 7, wherein the outer frame of the frame assembly further comprises a mounting flange adapted to allow the air filtration system to be mechanically coupled to a piece of equipment.

10. The air filtration system of claim 7, wherein the frame assembly further comprises a lower retaining bracket, the lower retaining bracket positioned to retain the door assembly to the frame assembly.

11. The air filtration system of claim 7, wherein the door retention assembly further comprises a retention feature adapted to retain the retention screw to the retention bracket.

12. The air filtration system of claim 11, wherein the retention feature comprises jam nuts.

* * * * *